I. T. Dyer,
Plow Mold Board.
No. 113,642. Patented Apr. 11, 1871.
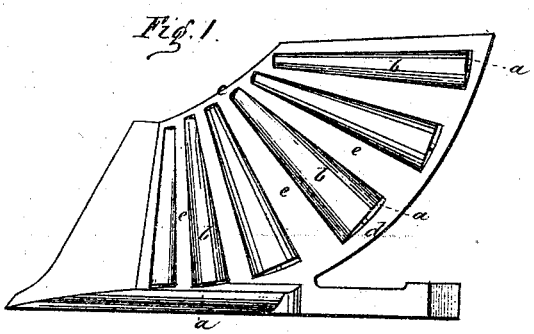
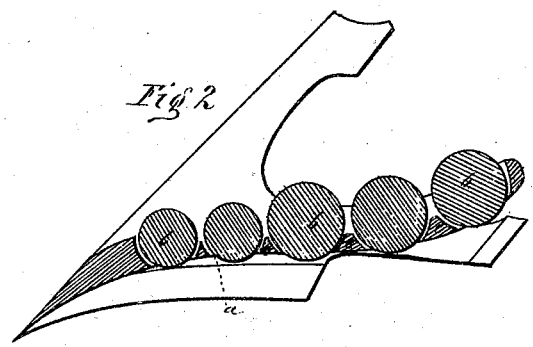
Witnesses.
Isaac T. Dyer, Inventor.
by Geo. E. Brown,
his Attorney.

UNITED STATES PATENT OFFICE.

ISAAC T. DYER, OF MACON, GEORGIA.

IMPROVEMENT IN MOLD-BOARDS FOR PLOWS.

Specification forming part of Letters Patent No. 113,642, dated April 11, 1871.

*To all whom it may concern:*

Be it known that I, ISAAC T. DYER, of Macon, Bibb county, Georgia, have invented an Improvement in the Mold-Board of a Plow, of which the following is a specification.

Figure 1 is a side elevation, and Fig. 2 is a transverse section.

This invention relates to mold-boards of that class which are provided with rollers mounted therein, and protruding to a sufficient distance outside thereof to prevent the mold-board from touching the adjacent side of the furrow, thereby diminishing the friction of the draft, and preventing the plow from clogging.

Referring to the drawings, the mold-board therein shown is constructed with a fan-shaped series of openings, *a*, each made with a regular taper from base to top, and each containing a conical roller, *b*, mounted loosely on pins, and placed lengthwise of its opening *a*. The mold-board is, in fact, a skeleton, consisting of the outside bars, *c d*, and the transverse bars *e*, which latter are of the shape of a curvilinear triangle in cross-section, those sides that are next to the rollers being concave, and the bars *e* consequently serving as clearers, which keep the rollers from clogging.

The rollers *b* extend sufficiently outside of the bars *e* to prevent the latter from coming in contact with the soil through which the plow passes, thereby reducing the friction of the draft, and keeping the plow from clogging in wet land.

I claim as my invention—

The skeleton mold-board, consisting, essentially, of the outside bars, *c d*, and the transverse clearing-bars *e*, in combination with the conical rollers *b*, as specified.

ISAAC T. DYER.

Witnesses:
   THOMAS RYAN,
   S. M. FARRAR.